(12) United States Patent
Ezekiel

(10) Patent No.: US 6,746,119 B2
(45) Date of Patent: Jun. 8, 2004

(54) SOFT MULTIFOCAL CONTACT LENS

(75) Inventor: Donald Frederick Ezekiel, West Perth (AU)

(73) Assignee: Iolco PTY LTD, West Perth (AU)

( * ) Notice: Subject to any disclaimer, the term of this patent is extended or adjusted under 35 U.S.C. 154(b) by 0 days.

(21) Appl. No.: 10/149,871

(22) PCT Filed: Dec. 13, 2000

(86) PCT No.: PCT/AU00/01531

§ 371 (c)(1),
(2), (4) Date: Jun. 13, 2002

(87) PCT Pub. No.: WO01/44860

PCT Pub. Date: Jun. 21, 2001

(65) Prior Publication Data
US 2003/0095231 A1 May 22, 2003

(30) Foreign Application Priority Data
Dec. 16, 1999 (AU) .............................. PQ 4683

(51) Int. Cl.⁷ ................................. G02C 7/04
(52) U.S. Cl. .................... 351/161; 351/160 H
(58) Field of Search ................ 351/160 R, 160 H, 351/161–162, 177

(56) References Cited

U.S. PATENT DOCUMENTS

| 4,573,775 A | | 3/1986 | Bayshore |
| 4,813,777 A | * | 3/1989 | Rainville et al. ........... 351/161 |
| 5,071,244 A | | 12/1991 | Ross |
| 5,483,304 A | * | 1/1996 | Porat .......................... 351/161 |
| 5,635,998 A | | 6/1997 | Baugh |
| 2002/0021410 A1 | | 2/2002 | Ye et al. ..................... 351/161 |

FOREIGN PATENT DOCUMENTS

| FR | 2582416 | | 11/1986 | |
| GB | 2033101 A | * | 5/1980 | ................. 351/161 |
| WO | WO 84/04401 | | 11/1984 | |
| WO | WO 99/23527 | | 5/1999 | |

* cited by examiner

Primary Examiner—Scott J. Sugarman
(74) Attorney, Agent, or Firm—Morrison & Foerster LLP

(57) ABSTRACT

A multifocal contact lens (10, 50) made of flexible material is able to translocate on an eye by virtue of a lower end (22) of the contact lens (10, 50) being truncated so as to provide a relatively wide surface. The lower end (22) engages with the lower eyelid of a wearer. The lower end (22) may be provided with a forwardly projecting ledge (52).

26 Claims, 3 Drawing Sheets

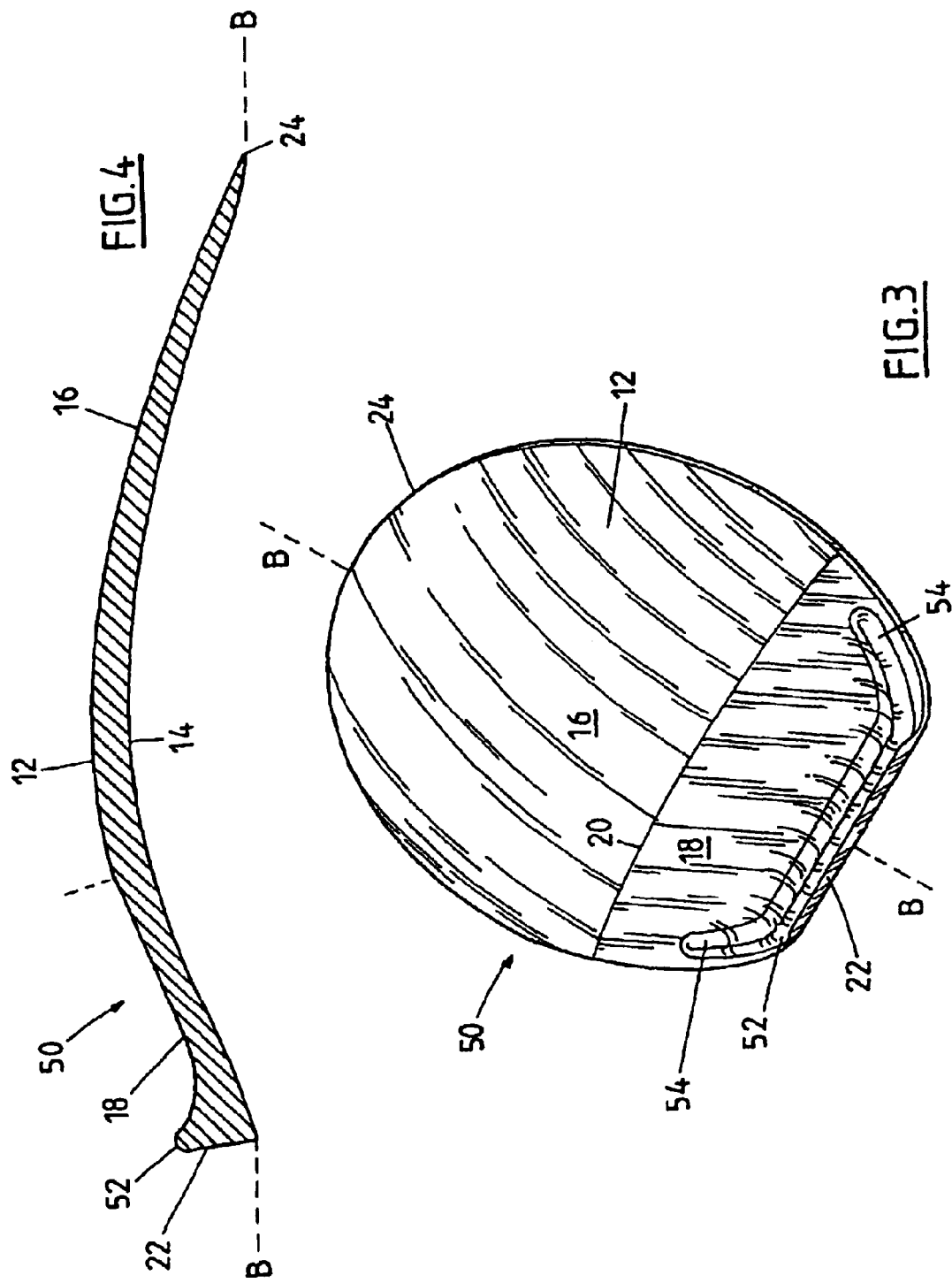

SOFT MULTIFOCAL CONTACT LENS

This application is a 35 U.S.C. §371 filing of International Patent Application No. PCT/AU00/01531, filed on Dec. 13, 2000. This application claims priority benefit of Australian Patent Application No. PQ4683 filed on Dec. 16, 1999 both incorporated by reference in their entirety herein.

FIELD OF THE INVENTION

The present invention relates to a Contact Lens.

SUMMARY OF THE INVENTION

In accordance with one aspect of the present invention there is provided a multifocal contact lens characterised in that the contact lens is made of flexible material, the contact lens is of a unitary construction and the contact lens is arranged to translocate on an eye, the contact lens having a front surface and a rear surface and an upper end and a lower end, wherein the lower end of the contact lens is truncated so as to provide a relatively deep end surface which is arranged to rest on a lower eyelid of the patient, the truncated lower end being provided with an integral forwardly projecting ledge having a lower surface which is also arranged to rest on the lower eyelid of the patient.

DESCRIPTION OF THE DRAWINGS

The present invention will now be described, by way of example, with reference to the accompanying drawings, in which:

FIG. 3 is a front perspective view of a contact lens in accordance with a second embodiment of the present invention; and FIG. 4 is a cross section along the line B—B of FIG. 3.

DETAILED DESCRIPTION OF THE INVENTION

Figure 1:
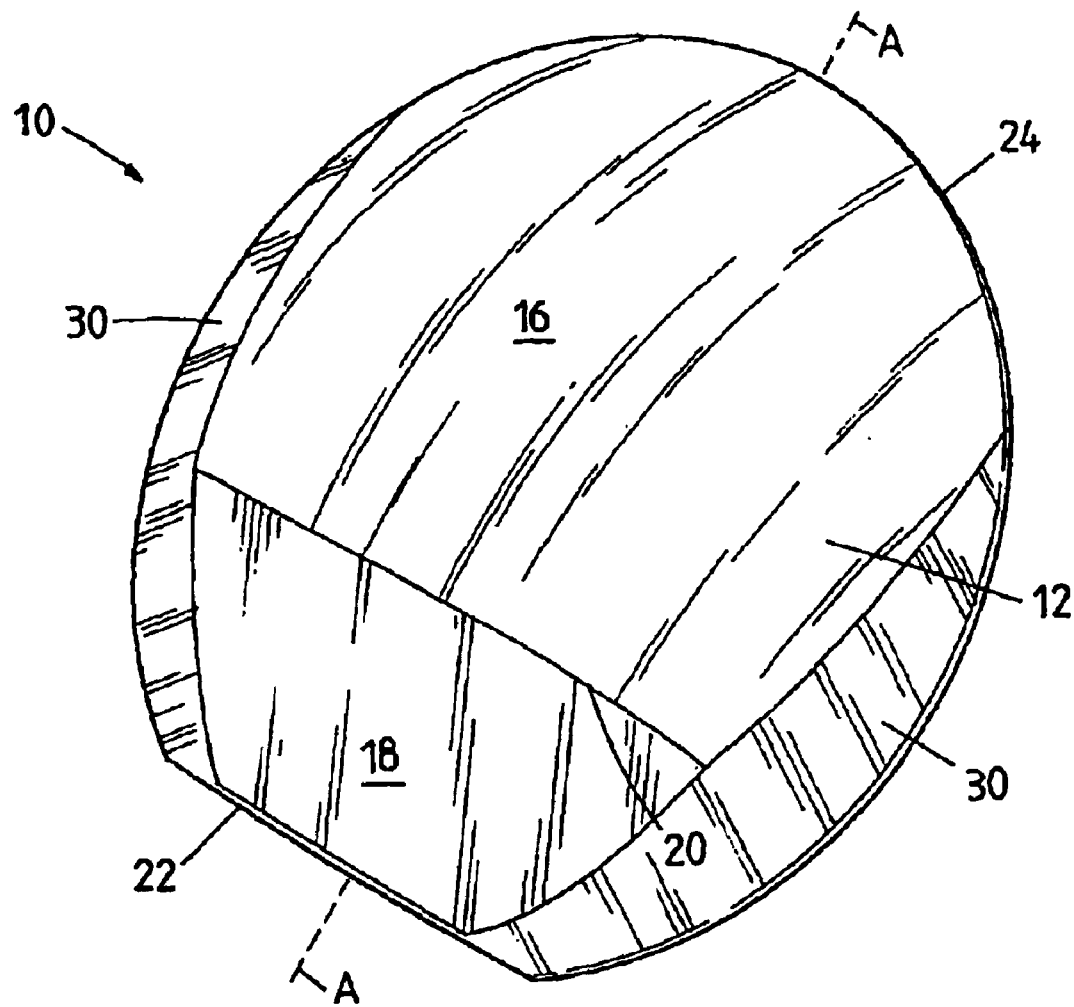
FIG. 1 is a front perspective view of a contact lens in accordance with a first embodiment of the present invention.
Figure 2:
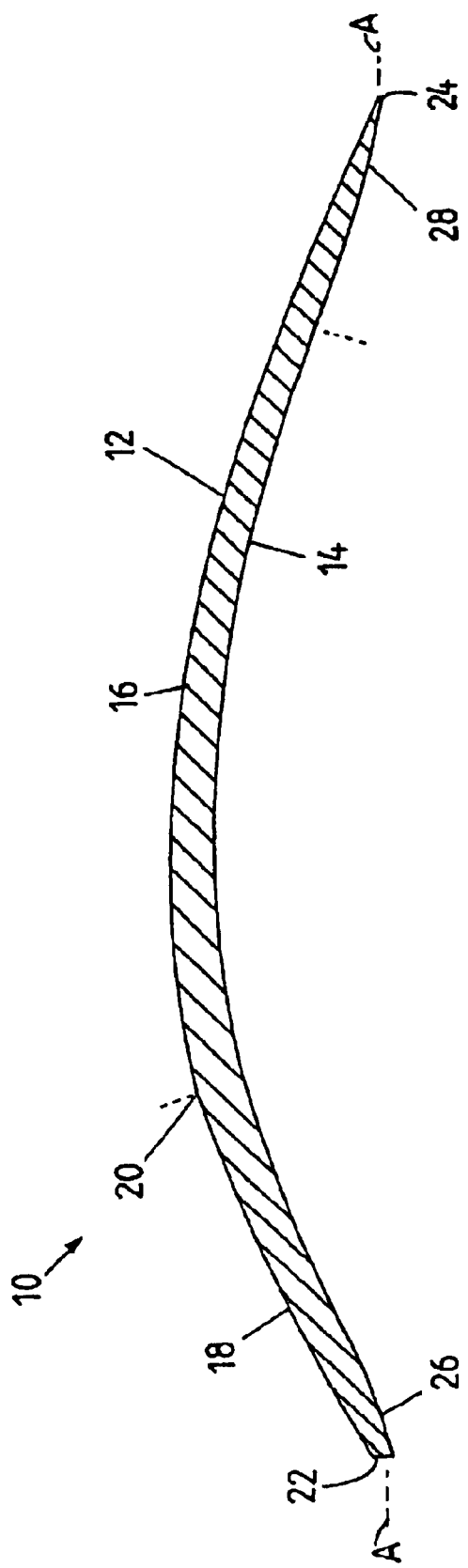
FIG. 2 is a cross-section along the line A—A of FIG. 1.

In FIGS. 1 and 2 of the drawings there is shown a contact lens 10 having a front surface 12 and a rear surface 14.

As shown in the drawings, the front surface 12 is subdivided into a distant vision front segment 16 and a close range vision front segment 18.

A distant vision front segment 16 has a curvature which preferably conforms to a spherical, aspherical or toroidal shape. It has been found that use of an aspherical shape for the front segment 16 enables the lens 10 to be made relatively thin.

Similarly, the close range vision front segment 18 has a curvature which preferably conforms to a spherical, aspherical or toroidal shape. It has been found that the use of an aspherical shape allows for a progressively variable close range reading area.

The segments 16 and 18 may meet along a laterally expanding line 20 as shown in FIG. 1 depending on the respective curvatures of the segments 16 and 18. Alternatively, the segments 16 and 18 may meet at a point.

The segment 18, as can be seen in FIG. 2, may be relatively thick compared to the segment 16 and may be in the form of a prism.

The prism stabilises the contact lens 10 on the eye and the amount of the prism depends on the lens power but it is preferably sufficient to hold the lens in position on the eye without rotation and without being uncomfortable for the patient.

The contact lens 10 is formed of a flexible material which is also soft. For example the contact lens 10 may be formed of soft hydrogel, silicone or a hybrid material formed from soft hydrogel and silicone or other flexible material. Further, the lens 10 is relatively large being, for example, larger than a corneal lens.

The contact lens 10 has a lower end 22 and an upper end 24. The prism is located adjacent the lower end 22. The presence of the prism adjacent the lower end 22 results in the contact lens 10 having a relatively bulky and heavy portion adjacent to the end 22. The end 22 is, as can best be seen in FIG. 2, truncated so as to leave an end surface which is relatively deep as shown in FIG. 2, compared to a nontruncated end. The truncation of the end 22 allows the contact lens 10 to rest on a lower eye lid of a patient so as to engage and hold the contact lens 10 in position.

Further, the rear surface 14 of the lens 10 is formed in a curved shape which may be spherical or aspherical or may be toroidal to correct for a patient's astigmatism. Further, adjacent the end 22 and the end 24 the rear surface 14 is preferably formed with secondary curve portions 26 or 28 respectively. The secondary curve portions 26 and 28 have a curvature which is less pronounced than that of the rear surface 14 so as to modify the lens fitting on the eye so as to facilitate translocation. The secondary curves may each be a single curve, a series of curves, an aspherical curve, or a combination of these curves.

The secondary curve portions 26 and 28 may only extend along part of the periphery of the lens 10 adjacent the ends 22 or 24 or they could be lengthened to extend around most of or all of the periphery of the lens 10.

The position of the junction 20 between the segments 16 and 18 may be varied as with bifocal spectacle lens, so that the position of the close range vision portion 18 may be customised to each patient. This allows the lens 10 to be fitted precisely to an eye of an individual patient.

As discussed above, the lower portion of the lens 10 adjacent the end 22 is bulkier and heavier than the upper portion adjacent the end 24. This ensures that the lens 10 is orientated in the correct way in use so that the distant vision segment 16 is uppermost and the close range vision segment 18 is lowermost.

Further, the contact lens 10 may have lateral lenticular portions 30 adjacent sides thereof. The lenticular portions 30, where present, are cut away portions which reduce lens bulk.

The contact lens 10 preferably has an overall size of from 10 to 16 mm preferably from 12.5 to 14.5 mm. The truncation at the lower end 22 may reduce the overall size of the lens by from 0.05 to 5 mm preferably by from 0.5 to 3 mm.

The contact lens 10 could have a third intermediate power vision segment between the segments 16 and 18. Further, the close range vision segment 18 may include an intermediate segment which is preferably a progressively variable or graduated portion for close vision.

In use, the lens 10 of FIGS. 1 and 2 is fitted to a patient's eye with the end 22 resting on the lower eyelid of the patient. Thus, when the patient looks downward, the eye moves relative to the contact lens 10 so that the visual axis is through the close, intermediate or graduated range vision segment 18.

The contact lens 10 cannot move downward because of the engagement between the end 22 and the lower eyelid.

Alternatively, when the patient looks up, the eye moves again relative to the contact lens 10 which is retained in place by the weight of the segment 18, so that the visual axis is through the upper portion of the contact lens 10 corresponding to the top portion or distant vision segment 16.

Thus, in operation, the contact lens 10 translocates relative to the eye so that the patient can selectively look through the lower close range vision segment 18 or the distant vision segment 16. Translocation is aided by the presence of the secondary curve portions 26 and 28.

In FIGS. 3 and 4, there is shown a contact lens 50 which is similar to the contact lens 10 and like reference numerals denote like parts.

In this case, however, the lower end 22 is provided with an integral forwardly projecting ledge 52 which, in use, is arranged to rest on the lower eyelid. The use of the ledge 52 has the advantage that the segment 18 may be made thinner than in the contact lens 10. Alternatively, the ledge 52 may be used in conjunction with a prism to add bulk to the lower part of the contact lens 50 to assist in correct lens orientation.

Further, the use of a thinner segment 18 reduces the overall weight of the contact lens 50. Thus, the contact lens 50 may or may not have the lenticular portions 30 of the contact lens 10.

The ledge 52 may extend across the entire lower end 22 of the lens 50 or over only a portion of the lower end 22. Typically, the ledge 52 may be from 2 to 10 mm, preferably from 4 to 6 mm wide at the end 22 where the contact lens 50 is truncated.

The presence of the ledge 52 adds bulk to the lower end 22 so allowing good lid action on the contact lens 50 to allow for lens translocation.

Further, as can be seen in FIG. 3, the ledge 52 may be provided with upwardly curved end portions 54 which act as weights and help to stabilise the contact lens 50 in use. The ledge 52 and the portions 54 may be conveniently formed by means of a lather or incorporated in a mould depending on the method of manufacture. Modifications and variations as would be apparent to a skilled addressee are deemed to be within the scope of the present invention.

What is claimed is:

1. A multifocal contact lens, comprising
   a distant vision segment;
   a close range vision segment;
   the lens having a periphery, a front surface, a rear surface having a curvature, an upper end, and a lower end;
   the distant vision segment being located close to the upper end relative to the close range vision segment which is located close to the lower end;
   a truncated portion located at the lower end;
   the truncated portion being arranged to rest on a lower eyelid; and
   a forwardly projecting ledge at the lower end of the contact lens, the forwardly projecting ledge including upwardly curved end portions, wherein the contact lens is configured to translocate on an eye.

2. A multifocal contact lens according to claim 1, wherein the forwardly projecting ledge is also arranged to rest on the lower eyelid.

3. A multi focal contact lens according to claim 2, wherein the truncated lower end and the forwardly projecting ledge have respective end surfaces which are coplanar with one another and are substantially straight.

4. A multifocal contact lens according to claim 1, further including at least one secondary curve portion located at the rear surface adjacent the periphery; the at least one secondary curve portion having a curvature which is less pronounced than that of the rear surface.

5. A multifocal contact lens according to claim 1, wherein the forwardly projecting ledge extends substantially along the entire lower end of the lens.

6. A multifocal contact lens according to claim 1, wherein the ledge is approximately 2 to 10 mm wide.

7. A multifocal contact lens according to claim 1, wherein the ledge is approximately 4 to 6 mm wide.

8. A multifocal contact lens according to claim 1, wherein the lower truncated end provides a relatively deep end surface which is arranged to rest on the lower eyelid.

9. A multifocal contact lens according to claim 1, wherein at least part of the periphery of the contact lens is formed with a lenticular portion adjacent the sides of the contact lens.

10. A multifocal contact lens according to claim 1, wherein the truncation of the lower end reduces the overall size of the lens by approximately 0.05 to 5 mm.

11. A multifocal contact lens according to claim 1, wherein the truncation of the lower end reduces the overall size of the lens by approximately 0.5 to 3 mm.

12. A multifocal contact lens according to claim 1, which further includes an intermediate vision segment between the close range vision segment and the distant vision segment.

13. A multifocal contact lens according to claim 12, wherein the intermediate vision segment is spherical, aspherical or toroidal in shape.

14. A multifocal contact lens according to claim 12, wherein the intermediate vision segment is progressively variable.

15. A multifocal contact lens according to claim 1, where in the close range vision segment is relatively thick compared to the distant vision segment.

16. A multifocal contact lens according to claim 1, wherein a lower portion of the lens which is close to the lower end is heavier than an upper portion of the lens which is close to the upper end.

17. A multifocal contact lens according to claim 1, wherein the close range vision segment includes a prism to assist in orientation.

18. A multifocal contact lens according to claim 1, wherein the distant vision statement is spherical, aspherical, or toroidal in shape.

19. A multifocal contact lens according to claim 1, wherein the close range vision segment is spherical, aspherical or toroidal in shape.

20. A multifocal contact lens according to claim 1, wherein the contact lens is larger than a corneal lens.

21. A multifocal contact lens according to claim 1, wherein the contact lens is made of flexible material.

22. A multifocal contact lens according to claim 1, wherein the contact lens has an overall size of approximately 10 to 16 mm.

23. A multifocal contact lens according to claim 1, wherein the contact lens has an overall size of approximately 12.5 to 14.5 mm.

24. A multifocal contact lens according to claim 1, wherein the contact lens is of unitary construction.

25. A multifocal contact lens according to claim 1, wherein the rear surface has a spherical, aspherical, or toroidal shape.

26. A multifocal contact lens according to claim 1, wherein junctions between segments extend laterally across the front surface.

* * * * *